United States Patent [19]

Krogsrud

[11] 4,080,530
[45] Mar. 21, 1978

[54] EQUAPOISED LAMP AND NEW COUNTERBALANCED ARM ASSEMBLIES

[76] Inventor: Jens Christian Krogsrud, Ekelyveien 10, Oslo 3, Norway

[21] Appl. No.: 735,988

[22] Filed: Oct. 27, 1976

[30] Foreign Application Priority Data

Oct. 28, 1975 Norway ................................. 753610
Oct. 28, 1975 Norway ................................. 753611

[51] Int. Cl.² ............................................. F21V 21/26
[52] U.S. Cl. ................................. 362/402; 362/427; 248/280; 248/281
[58] Field of Search ............. 240/67, 69, 73 BJ, 81 R, 240/81 BA, 81 BE; 248/280, 281, 292, 123

[56] References Cited

U.S. PATENT DOCUMENTS

| 2,911,525 | 11/1959 | Strom | 240/73 BJ |
|---|---|---|---|
| 3,426,190 | 2/1969 | Bobrick | 248/280 |
| 3,856,251 | 12/1974 | Miller | 240/81 BE |
| 4,003,536 | 1/1977 | Sekerich | 248/280 |

FOREIGN PATENT DOCUMENTS

| 137,284 | 8/1948 | Australia | 248/280 |
|---|---|---|---|
| 2,354,544 | 5/1975 | Germany | 240/81 BA |

*Primary Examiner*—William H. Beha, Jr.
*Attorney, Agent, or Firm*—Harold L. Stults; Pasquale A. Razzano

[57] ABSTRACT

An equapoised lamp comprising a lamp head mounted upon an arm assembly which is counterbalanced by springs enclosed within square tubes which are components of the arm assembly. The arm assembly has a lower pair of parallel arms which are pivoted at their lower ends to a swivel bracket which turns about a vertical axis in a fixed bracket. Each of those arms is pivoted at its upper end to a floating bracket which has pivoted to it a similar upper pair of parallel arms. A lamp assembly is mounted upon the other end of the upper pair of arms by a universal joint assembly. The arms are tubular, and each pair forms a parallelogram by virtue of the pivotal connections with the respective brackets. A coil spring is enclosed within one of each pair of tubes which exerts a counterbalancing effect upon its pair of arms. A nylon shoe is mounted upon the free end of each spring and enclosed within the tube. The shoe transmits the counterbalancing force from the spring to the adjacent bracket.

14 Claims, 6 Drawing Figures

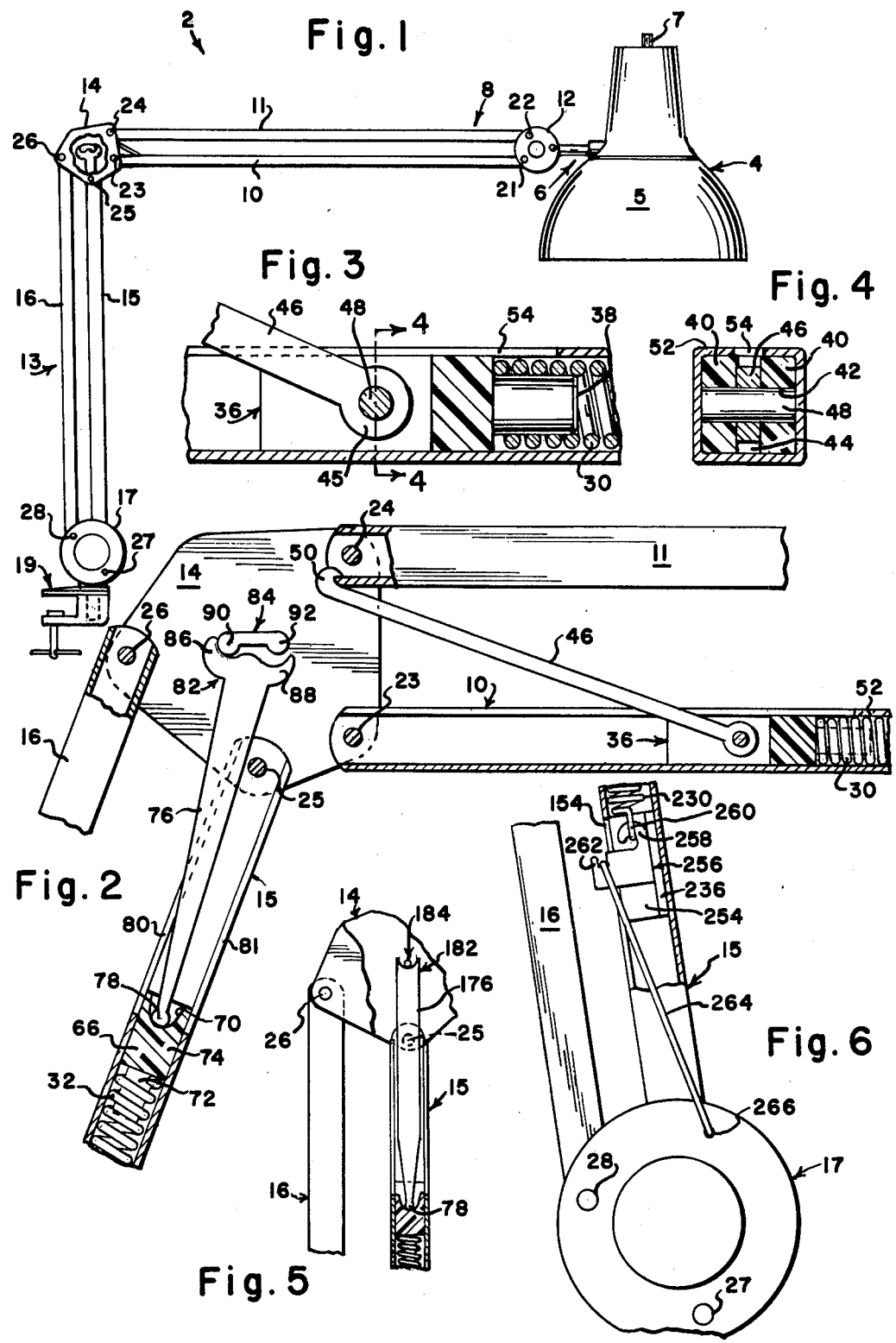

EQUAPOISED LAMP AND NEW COUNTERBALANCED ARM ASSEMBLIES

This invention relates to spring counterbalanced arm assemblies, and more in particular to such assemblies incorporated in lamps.

An object of this invention is to provide improved spring counterbalanced arm assemblies. A further object is to provide lamps incorporating such assemblies which avoid difficulties encountered with such constructions in the past. A further object is to provide spring counterbalanced arm assemblies of the above character which are superior to those available in the past in that they are more attractive and which do not have exposed springs. These and other objects will be in part obvious and in part pointed out below.

Spring counterbalanced arm assemblies have been provided for supporting various components and objects, and particularly for incorporation into lamps. Some such assemblies have been provided which are free of external springs, but they have had serious deficiencies in use. For example, some have not functioned properly while others have been too complicated or costly or have had limited useful life. Counterbalanced arm assemblies with external coil springs have been provided and have proven very satisfactory. However, the springs tend to collect dust and other dirt, although that objection has been somewhat reduced by providing sleeves over the springs. Nevertheless, the mounting structures for the springs cause certain difficulties. The best known type of lamps having the external springs are provided with two parallelogram arm assemblies, the lower of which is swingably mounted at its bottom end upon a swivel pivot, and which is hinged at its other end to one end of the upper arm. The lamp assembly or lamp head is mounted upon the other end of the upper arm, and is provided with a universal joint mounting. Each of the parallel arm assemblies is formed by two tubular arms which are of equal length and pivoted separately at their ends upon brackets so as to form a parallelogram relationship. Each arm assembly is provided with two or more springs mounted along the sides of the arms so as to provide counterbalancing forces. Those forces support the lamp assembly so that it can be moved throughout the wide range of the swinging movement of the arm assemblies both vertically and horizontally.

Counterbalanced arm assemblies have also been provided for objects such as television sets where each arm is formed by mating channels which enclose the counterbalancing springs. It is an object of the present invention to provide arm assemblies for lamps and other objects wherein counterbalanced springs are totally enclosed within the arm assemblies. It is a further object to provide for the above with constructions wherein coil springs exert forces longitudinally of the arms and those forces are exerted in an improved manner to provide the desired counterbalancing effects. These and other objects will be in part obvious and in part pointed out below.

Referring to the drawings:

FIG. 1 is a plan view of a lamp constituting one embodiment of the invention;

FIG. 2 is an enlarged plan view with parts broken away showing the construction at the upper left-hand portion of FIG. 1;

FIG. 3 is a greatly enlarged view of the lower right hand portion of FIG. 2;

FIG. 4 is a sectional view on the line 4—4 of FIG. 3;

FIG. 5 is a fragmentary view of a modified form of the construction of FIG. 2; and, FIG. 6 is an enlarged plan view with parts broken away of the lower portion of another embodiment of the invention which is identical with that of FIG. 1, except for the construction shown.

Referring to FIG. 1 of the drawings, a lamp 2 has a lamp head or lamp assembly 4 of known construction which is formed by a lamp shade 5 within which is mounted a bulb and socket assembly (not shown) having a switch 7 at the top of the shade. The lamp assembly is mounted upon a known type of universal pivot assembly 6 upon the free end of a parallelogram arm assembly 8 formed by a pair of square tubular arms 10 and 11, a bracket 12 to which the right-hand ends of the arms are pivoted and a floating bracket 14 at the left to which the left-hand ends of the arms are pivoted. The arms are of identical length and the spacings between the pivots in brackets 12 and 14 are equally spaced so as to form a parallelogram relationship.

Bracket 14 is in turn mounted upon the upper end of an arm assembly 13 formed by a pair of arms 15 and 16 which are identical with arms 10 and 11. Arms 15 and 16 are pivoted in parallel relationship at their upper ends to bracket 14 and at their lower ends to a swivel bracket 17. The spacings between the pivotal connections between arms 15 and 16 and bracket 14 are the same as those between the arms and bracket 17 so as to provide a parallelogram relationship. Bracket 17 is pivotally mounted to swing about a vertical axis in a mounting clamp or bracket 19 which is clamped to the edge of a table or other support. Arms 10, 11, 15 and 16 are thin walled tubes, in this embodiment steel. Arms 10 and 11 are attached to bracket 12 by pivot bolts 21 and 22, respectively, and to bracket 14 by bolts 23 and 24, respectively. Arms 15 and 16 are pivoted to bracket 14 by bolts 25 and 26, respectively, and to bracket 17 by bolts 27 and 28, respectively. Those bolts act as pivot pins for the arms, and also assist in holding the side plates forming the brackets in place.

Each of the arm assemblies is counterbalanced by forces tending to hold the lamp assembly 4 against the action of gravity while in any position to which the lamp assembly is moved manually. The lamp assembly can be swung vertically through an arc determined by the pivots formed by bolts 23 and 24, and arms 15 and 16 may be swung around the pivots formed by bolts 27 and 28 so as to move the lamp assembly horizontally with there also being downward movement from the position shown. During that movement the aspect of the lamp assembly is unchanged, that is, the lamp assembly remains in the vertical axis position shown, or in any other position to which it is turned by virtue of the universal pivot assembly 6. It is known that an arm assembly of the general type described above provides a very satisfactory mounting for a lamp assembly with the arm assembly being spring counterbalanced. The present invention is characterized as having an improved spring counterbalanced system.

Referring to FIG. 2 of the drawings, the counterbalancing forces are produced by spiral coil springs, e.g., a tension spring 30 in arm 10, and a compression spring 32 in arm 15. Spring 30 rests at its right hand end (see FIGS. 1 and 2) upon a bolt 21 extending through the arm, and its left-hand end is attached to a shoe 36 which is slidably mounted in the tube (see FIGS. 3 and 4). Shoe 36 is square in cross-section with an integral cylindrical extension or stud 38 which acts as an anchor to provide a firm attachment to the end of spring 30. Stud 38 may be provided with threads mating with the coils of the spring or ribs when desirable. However, in the present embodiment the stud has a smooth cylindrical surface of slightly greater diameter than the inner diameter of the spring. The stud is forced into the end of the spring, and the spring tends to bite into the stud and to clamp it sufficiently to provide the desired connection.

The main portion of shoe 36 presents an outer surface which conforms to the inner surface of tube 10 so as to provide a free-sliding relationship. That relationship is insured by the low friction between the nylon shoe and the tube. The main body portion of shoe 36 is formed by two parallel legs 40 with a slot 44 between them, and the shoe has a central transverse bore 42. Positioned in slot 44 is the end of a rod 46 which has an eye 45 with a bore of the same diameter as bore 42 and aligned therewith. A pin 48 is positioned in bore 42 and the bore in the rod so as to provide a hinged or rocking connection between the rod and the shoe.

As shown in FIG. 4, the top wall 52 of arm 10 is provided with a slot 54 which is slightly greater than the width of rod 46 so as to permit the rod to extend upwardly and move freely with shoe 36 as the shoe moves toward and away from the end of arm 10. Rod 46 extends at an angle through slot 54 to a point adjacent the pivotal connection between arm 11 and bracket 14. The end of the rod has an integral hook 50 which extends around the left-hand edge of the bottom wall of arm 11 so that rod 46 is anchored at its left-hand end to bracket 14 through the end of tube 11 and pin 48 which is held in place by the side walls of arm 10.

When arms 10 and 11 swing downwardly from the positions shown, the portion of the arm where shoe 36 is positioned in FIG. 1 is moved away from the left-hand end of arm 11 so that shoe 36 is pulled and slides to the left in the arm. That extends spring 30 and increases the tension on the spring. The force of the spring is exerted along the axis of the arm, and shoe 36 moves along that axis. The angular relationship between that axis and rod 46 does not tend to distort the spring, and the low-friction relationship between the shoe and the arm insure that the shoe will move freely longitudinally of the arm. Similarly, when arms 10 and 11 swing upwardly from the position shown, shoe 36 moves to the right in the arm and the tension on the spring is reduced. The characteristics of spring 30 are such as to insure proper counterbalancing forces throughout the range of the swinging movement of the arms.

As indicated above, spring 32 in arm 15 is a compression spring. Shoe 66 is anchored in the upper end of spring 32, and the bottom end of the spring (FIG. 1) rests upon a bracket (not shown) positioned within the tube and held in place and rests upon bolt 27. Shoe 66 has a semi-cylindrical recess or socket 70 in its top end. Shoe 66 is square in cross-section, and it is dimensioned so as to be snugly received in the tube and to slide freely in the same manner as shoe 36. A compression rod 76 has a bottom end 78 which rests in socket 70 so that the rod can rock with minimum friction with respect to the shoe. The left-hand and right-hand side walls of tube 15 have slots 80 and 81, respectively, which are similar to slot 54 in that they are slightly wider than the associated rod 76.

The upper end 82 of rod 76 rests against a bracket 84 which is mounted upon and extends between the side plates of the floating bracket 14. The upper end of the rod 76 has two arcuate side fingers 86 and 88 each of which forms a socket portion, and bracket 84 has two end pivots 90 and 92 which presents semi-cylindrical surfaces which are adapted to mate with the surfaces of the respective fingers 86 and 88.

When arms 15 and 16 are in the position of FIG. 1, rod 76 is in longitudinal alignment with arm 15, and shoe 66 is at its position closest to the upper end of the arm. As arms 15 and 16 are swung to the right from the vertical position of FIG. 1 to that of FIG. 2, rod 76 is moved out of alignment with arm 15 and shoe 66 is slid downwardly along the arm. That compresses spring 32, and increases the counterbalancing force exerted by the spring. The relationship between end pivot 90 of bracket 84 and finger 86 of the rod provided a low-friction relationship, and insures smooth swinging movement of arms 15 and 16. When arms 15 and 16 are swung to the left from the position of FIG. 1, there is a similar action with rod 76 swinging through the slot 81 in the right hand wall of the arm, and with a corresponding relationship between end pivot 92 and finger 88. Pivots 90 and 92 are so positioned that when arms 15 and 16 are in the vertical position of FIG. 1 they are equally spaced from an extension of the center line of arm 15. That spacing from that center line can increase the change in counterbalancing effect as the arms 15 and 16 are swung from the vertical position of FIG. 1, and that spacing can be different for the two pivots. Thus, the parallelogram formed by arms 15 and 16 and brackets 14 and 17 is provided with a constant counterbalancing force which is compensated for changes in the angular positions of the arms. It is thus seen that the two arm assemblies provided proper support for the lamp assembly throughout the entire range of its movement.

In the embodiment of FIG. 6, the construction is identical with that of FIG. 1, except that the counterbalancing spring assembly for the arm assembly 15–16 at the upper end of arm 15 is replaced by the counterbalance spring assembly shown at FIG. 6. A tension spring 230 is positioned in arm 15 and is similar to spring 30 and anchored to the arm in the same manner. A nylon shoe 236 is positioned at the lower end of the spring, and is channel shaped in cross-section with a slot 254 with the top of the channel being in alignment with a slot 154 in the left-hand wall of the arm. A metal clip 256 is positioned in the channel of the shoe and attached thereto. Clip 256 has a hook 258 at its upper end, and the end of spring 230 has a terminal hook portion 260 which in inter-engaged with hook 258. Clip 256 extends through slot 254 and has a hook 262 exterior of the arm. A rod 264 has hooks on its ends with the lower hook being positioned in a hole 266 in bracket 17. The hook at the upper end of rod 264 is engaged with hook 262 on clip 256. When arms 15 and 16 are swung about the pivots formed by bolts 27 and 28 clockwise from their vertical positions, clip 256 is pulled downwardly along arm 15. That movement is facilitated by the fact that shoe 236 provides a secure mounting for the clip with minimum friction between the shoe and the arm surfaces. The downward movement of clip 256 pulls the lower end of spring 236 downwardly and increases the tension on the spring. The counterbalance effect is increased continuously when the arms are swung from the vertical positions clockwise to the limit of that movement. Hole 266 is so positioned as to provide minimum tension on the spring when arms 15 and 16 are in their vertical positions. When the arms are swung counterclockwise from their vertical positions, the tension on the spring is gradually increased to provide the desired counterbalancing force.

The positioning of the springs within the tubular arms overcomes various objections and difficulties which are present with exposed springs. The provision of the shoes as anchors for the ends of the springs insures that the counterbalancing forces of the springs are transmitted efficiently and dependably at all times. In each arm assembly, one arm has one end operatively connected to its shoe and thence to its spring, and its other end connected to its bracket. The rod acts as connecting means with the spring (through its shoe) extending through a slot in the side wall of the arm. Also, it should be noted that in each case, the gravity forces and the counterbalancing forces maintain a static situation at every position of the arm. Also, as illustrated by the arms positioned as in FIG. 2, the angular relationship between rod 46 and the longitudinal axis of arm 10 causes the spring to produce a counterbalancing effect which is somewhat less than full force exerted by the spring.

It is understood that modifications of the illustrative embodiments and other constructions can be provided within the scope of the claims which incorporates the invention. For example, a heavy duty arm assembly can be mounted upon bracket 14 (FIG. 1) in place of arm assembly 13 to support a television set. Also, a single or double arm assembly can be used to support objects such as tools and other equipment.

Another possible modification of the lower arm assembly 13 is shown in FIG. 5. The construction is identical with that of FIGS. 1-4, except that compresssion rod 76 and the bracket 84 are replaced by the rod 176 and the pin 184, respectively. This construction involves a simplified operation where the compression rod pivots around a single pin at its upper end.

What is claimed is:

1. In a counterbalanced arm assembly, the combination of, a parallelogram arm assembly comprising a pair of parallel tubular arms and two bracket means positioned at the opposite ends of said arms and means pivotally connecting each end of each of said arms to the adjacent bracket means at pivot axes which define substantially a rectangle, one of said arms comprising means providing an elongated cavity and having a slot in its side walls extending longitudinally from adjacent one end thereof toward the other, an extensible spring positioned within said cavity with an end portion adjacent said slot and adapted to be moved therealong against the force exerted by said spring, a shoe operatively related to said spring with said end of said spring engaging surfaces of said arm and slidable therealong, and connecting means extending through said slot and mechanically connected between said adjacent bracket means and said shoe, and operative to transmit counterbalancing forces from said spring through said shoe to said arm assembly.

2. An assembly as described in claim 1 wherein said connecting means comprises a rod having one end mechanically related to said shoe to provide a rocking movement generally around an axis parallel to the pivotal axes between said arms and said bracket means.

3. An assembly as described in claim 2 wherein said spring is a coil tension spring and said shoe comprises a block having a substantially the cross-sectional configuration of said cavity and a transverse slot, and pivot means interconnecting the end of said rod to said shoe.

4. The assembly as described in claim 2 wherein said spring is a compression spring, and wherein said shoe has a socket and said rod has an end portion positioned within said socket and has a surface mating with the surface of said socket.

5. An assembly as described in claim 2 wherein said spring is a coil spring and said one of said arms is a tubular construction of substantially square cross-section with said slot opening along one side through which said connection means extends.

6. An assembly as described in claim 1 which includes a second counterbalanced arm assembly having the characteristics described of the first named arm assembly wherein one of said bracket means is common to both of said arm assemblies.

7. The construction as described in claim 6 which includes, a lamp assembly mounted upon the end of one of said arm assemblies opposite said common bracket means, and means mounting the other of said arm assemblies at its end remote from said common bracket means.

8. The construction as described in claim 7 wherein the spring in one of said arm assemblies is a coil type tension spring which is expanded progressively to increase its counterbalancing force, and wherein said spring in the other of said arm assemblies is a compression spring which is progressively compressed to increase its counterbalancing force.

9. In a counterbalanced arm assembly, the combination of, a parallelogram arm assembly comprising a pair of parallel tubular arms and two bracket means positioned at the opposite end of said arms and means pivotally connecting each end of each of said arms to the adjacent bracket means at pivot axes which define substantially a rectangle, one of said arms comprising a tube providing an elongated cavity and having a slot in its side wall extending longitudinally from adjacent one end thereof toward the other, a spring positioned within said cavity and with its other end anchored to said one arm, a shoe positioned within said one arm adjacent said one end of said spring and operatively associated therewith whereby a force can be exerted on said spring longitudinally of said tube, said shoe being adapted to slide freely along said one tube, anchor means mounted adjacent one of said bracket means in a predetermined position with respect to the adjacent pivoted end of said one arm, and an elongated means interconnecting said free end portion of said spring with said anchor means and adapted to exert said force on said spring to move said shoe and the interconnected end of said spring longitudinally of said tube in opposition to the force exerted by said spring, said spring being adapted to be stressed longitudinally of said one arm by the exertion of force and to thereafter produce forces counteracting the gravity pull to maintain a static situation at every position of said one arm.

10. The assembly as described in claim 9 wherein said spring is a tension spring wherein said elongated means comprises a rod, and which includes means rockably attaching said rod to said shoe, and wherein said rod is rockably attached to anchor means.

11. The assembly as described in claim 9 wherein said spring is a coil-type compression spring and wherein said elongated means is a compression rod and said shoe is provided with a socket and said compression rod has an end portion positioned within said socket and rockable therein, and which provides a bracket against which the other end of said compression rod is urged by the action of said spring, said bracket and said other end of said rod having mating cooperating surfaces.

12. The assembly as described in claim 9 wherein said tubular arms are thin-walled steel which are square in cross-section and wherein said shoe is a block of nylon having outer surfaces mating with the inner surfaces of said one of said tubes.

13. The assembly as described in claim 12 wherein said shoe has a pair of parallel arms and a stud at its end adjacent said spring and anchored into the end of said spring.

14. The assembly as described in claim 9 wherein said shoe is a nylon block and said one arm is a steel tube of square cross-section and said shoe is slidably mounted within said one arm and has a socket at one end and a stud projecting into said spring at its other end.

* * * * *